United States Patent [19]

Scales et al.

[11] 4,039,924
[45] Aug. 2, 1977

[54] HIGH VOLTAGE WINDING ASSEMBLY WITH IMPROVED REGULATION

[75] Inventors: Edgar F. Scales; Eugene K. Von Fange, both of Chesapeake; Robert F. Wood, Portsmouth, all of Va.

[73] Assignee: General Electric Company, Portsmouth, Va.

[21] Appl. No.: 644,979

[22] Filed: Dec. 29, 1975

[51] Int. Cl.² .................... H02M 7/10; H01F 35/00
[52] U.S. Cl. ................................. 363/65; 315/411; 323/49; 336/185
[58] Field of Search .................. 321/2, 8 R, 27 R, 46; 178/DIG. 11; 315/411; 336/107, 185, 192, 208; 323/49

[56] References Cited

U.S. PATENT DOCUMENTS

| | | | |
|---|---|---|---|
| 3,562,623 | 2/1971 | Farnsworth | 321/2 |
| 3,573,694 | 4/1971 | Von Fange et al. | 336/198 |
| 3,644,986 | 2/1972 | Verma | 29/593 |
| 3,657,632 | 4/1972 | Miyoshi | 321/27 R |
| 3,665,288 | 5/1972 | Godawski | 315/27 X V |
| 3,813,574 | 5/1974 | Sato | 315/411 |
| 3,843,903 | 10/1974 | Miyoshi | 178/DIG. 11 |
| 3,886,434 | 5/1975 | Schreiner | 321/27 R |
| 3,904,928 | 9/1975 | Sawada et al. | 321/2 |
| 3,947,749 | 3/1976 | Kimura et al. | 178/DIG. 11 |

*Primary Examiner*—William H. Beha, Jr.

[57] ABSTRACT

A high voltage winding assembly is disclosed which provides a substantially rectangular high voltage pulse output in response to a magnetically coupled pulse input thereby resulting in improved regulation of the output voltage. A plurality of narrow width and relatively high windings, referred to as washer-shaped windings, is mounted over a primary winding. The height and width of each winding is selected to produce a predetermined capacitance of the winding. The washer-shaped windings are a-c electrically separated from each other by means of diodes connected in series between the windings. The use of the diodes and the selection of the proper height to width ratio positions the a-c null of each winding somewhere within the winding. The washer-shaped windings are separated or spaced from each other by means of a dielectric, the spacing controlling the leakage inductance of the high voltage winding without substantially affecting the capacitance. Each washer-shaped winding is terminated by diode means to convert the a-c voltage to a d-c voltage, with the plurality of d-c voltages being summed to provide the required high voltage.

8 Claims, 9 Drawing Figures

HIGH VOLTAGE WINDING ASSEMBLY WITH IMPROVED REGULATION

CROSS REFERENCE TO RELATED APPLICATIONS

The specification and drawings herein describe novel subject matter relating to means of making corona discharge free connections to the start turns of windings of fine wire, which subject matter is claimed in U.S. Application Ser. No. 644,980, entitled "High Voltage Winding Lead and Terminal Structure" of Wayne M. Niederjohn and John R. Underwood filed the same day as this application and assigned to the assignee herein. The drawings and specification herein also disclose inventive subject matter claimed in U.S. Application Ser. No. 645,012, entitled "High Voltage Transformer Winding Assembly," filed by Charles Suthers on the same day as this application and assigned to the assignee herein.

BACKGROUND OF THE INVENTION

The present invention relates to a high voltage winding assembly with improved regulation. More particularly, the present invention relates to a high voltage winding assembly or tertiary winding assembly of a flyback transformer which provides an improved flat-topped or substantially rectangular shaped pulse output, sometimes referred to herein as a square wave, resulting in improved voltage regulation for varying load conditions.

The present invention is particularly useful in the high voltage flyback transformer of television receivers and similar uses which require the development of a high voltage from a pulse input with a relatively moderate load current. In television receivers, the desire for brighter pictures from color television receivers has placed greater demands on the cathode ray tube high voltage power supply. The desired increase in brightness may be achieved by using a higher cathode ray tube anode voltage and improving the regulation of this voltage. The higher voltage itself is theoretically relatively easy to produce by increasing the turns ratio. However, even increasing the number of turns creates problems with core saturation. The corresponding improvement in regulation presents an even more difficult problem. In addition, corona discharge problems arise when the number of turns in a single high voltage winding is increased.

In accordance with the present invention, it has been found that a substantially rectangular pulse output from the high voltage winding of the flyback transformer produces improved voltage regulation. However, the tuning of the high voltage winding assembly must be accomplished in a manner so as to avoid excessive ringing after the pulse. The excessive ringing would cause distortion in the horizontal sweep output and possibly in the video circuits. By tuning for predetermined resonant frequencies in the range of 4.5 to 7.5 times the fundamental frequency of the input pulse and by controlling the relative amplitude of the tuned frequency signals, a substantially rectangular output pulse may be generated with a minimum or acceptable level of ringing.

In prior art attempts to produce the large d-c voltages, by increasing the number of turns on the high voltage winding in a conventional manner, the bulk of the high voltage winding created large capacitances and inductances which allowed tuning only at the lower frequencies. Tuning to frequencies in the range of 4.5 to 7.5 times the frequency of the applied pulse was impossible. The frequency of the applied pulse referred to is the reciprocal of twice the pulse width of the applied pulse.

In the past, attempts to provide the high voltage output with some degree of regulation have resulted in the use of smaller high voltage windings which produce a fraction of the required output voltage, for example one third the required voltage. A diode-capacitive voltage multiplier was then used in conjunction with this smaller high voltage winding to produce the required high voltage. By using a smaller high voltage winding, a certain degree of tuning and pulse output shaping were achievable to produce some degree of regulation. However, diodes used in the voltage multiplier adversely affected regulation. Furthermore, the capacitors required in such voltage multipliers were relatively expensive and were subject to failure thereby reducing reliability. Furthermore, due to the large capacitive currents, diodes used in the multipliers were subject to large current surges and possible failure thereby adversely affecting reliability.

Slot wound high voltage transformers per se have been known in the prior art. For example, U.S. Pat. No. 3,573,695 — Eugene K. Von Fange et al. assigned to the 3,573,694 herein discloses a slot wound transformer provided with progressively increasing inner diameters for the high voltage slots. U.S. Pat. No. 3,644,986 — Jugal K. Verma, also assigned to the assignee herein, discloses a method of tuning a high voltage transformer by electrically connecting a tuning capacitor in parallel with the primary winding. However, the prior art does not teach a slot wound transformer in accordance with the principles of the present invention which may be tuned to provide a rectangular, square wave of flat-topped pulse output which results in improved high voltage regulation. The term square wave, flat-topped pulse or rectangular shaped pulse are used interchangeably throughout, with it being understood that the term square wave conventionally means a pulse having relatively steep sides and a relatively flat top with dimensions which may be rectangular.

SUMMARY OF THE INVENTION

The problems and dilemmas existing in the prior art have been solved and eliminated by means of the present invention. The present invention provides a means of generating a sufficiently high voltage with the required turns being separated into a plurality of windings making up a high voltage winding assembly. More importantly, the present invention enables the tuning of the high voltage winding assembly to predetermined resonant frequencies and the controlling of the amplitudes at the various resonant frequencies such that a rectangular output pulse wave form is generated by the high voltage winding assembly even though the input pulse or flyback pulse itself is not rectangularly shaped. The present invention does not attempt to produce an ideal transformer in which the output would be a stepped up version of the input. The present invention is directed to among other things, means for varying the leakage inductance of the high voltage winding assembly and the stray capacitance to enable the shaping of a rectangular output pulse from a non-rectangular input pulse wave form. The production of this rectangular pulse wave shape output improves the regulation of the output voltage. In other words, by use of the present invention, smaller changes in the magnitude of the output voltage occur in response to varying load conditions.

The present invention does not simply attempt to increase the number of turns in a winding. The present invention provides an assembly of a plurality of smaller windings which comprise the high voltage winding assembly. The high voltage winding assembly is tunable allowing the high voltage assembly to resonate at various higher frequencies. The fundamental frequency of the input to the high voltage winding assembly may be considered to be equal to the reciprocal of twice the pulse width of the flyback pulse. In accordance with the present invention, it has been found that resonant frequencies in the range of 4.5 to 7.5 times the fundamental frequency are extremely useful in shaping the output pulse wave form, when combined in predetermined relative amplitude relationships.

The present invention utilizes a plurality of windings connected in series-aiding relationship to provide d-c summation of the outputs of each winding with means to provide a-c isolation between the windings. There are at least two means for providing the a-c isolation between windings. In one embodiment, series-aiding diodes are connected between the windings to provide a-c electrical separation. The diodes at the ends of windings force the a-c null into the winding. This is in contrast to the case where one end of the coil may be grounded with the a-c null appearing at that point. However, the physical parameters of the winding determine where within the winding the a-c null will be located. To a substantial extent, the a-c null tends to the center of the winding when the capacitance to ground of the winding equals the capacitance to free space of the winding. The ground plane for the winding is the magnetic core. The primary itself is relatively close to ground as compared with the voltage on the high voltage windings. As the height of the winding is increased, the capacitance to ground of the winding is reduced since a larger number of turns are spaced farther from ground. Also, decreasing the width of the winding decreases the stray capacitance to ground since the width of the capacitance plate formed by the turns of the high voltage winding is decreased. Preferably, the values of the height and width of the winding are selected to produce a stray capacitance to ground approximately equal to the stray capacitance to free space thereby forcing the a-c null to approximately the center of the winding.

The creation of the a-c null in the center of each of the windings creates an a-c voltage distribution along the winding in which one end of the winding, at a particular instant of time, will be at a positive peak potential and the opposite end of the winding will be at a negative peak potential. Therefore, the peak a-c voltages with respect to ground are one-half of the peak magnitude that would occur if the a-c null were located at or near one of the ends of the winding. With the a-c null in the center of the winding, the maximum peak voltage of the winding is $1/2n$ times the peak voltage of a winding without the diodes and grounded at one end, where $n$ equals the number of separate windings. The division of the a-c voltages by $1/2n$, where $n$ equals the number of windings, also reduces the reflected stray capacitance by the same ratio. This is due in part to the fact that the stray capacitance of the secondary is reflected back to the primary in accordance with the formula where the total reflected capacitance is the sum of all of the individual reflected capacitance having a magnitude defined by the formula $(1/2n \cdot ns/np)^2 CS$ where CS is the stray capacitance of the secondary and $n$ equals the number of windings, $ns$ is the number of turns in the secondary and $np$ is the number of turns in the primary. This summation simplifies to $2n(1/2n)^2 \cdot (ns/np)^2 CS$ and results in the total reflected capacitance being $(1/2n) \cdot (ns/np)^2 CS$. The reflected capacitance of a winding assembly comprised of a single winding grounded at one end would be equal to $(ns/np)^2 CS$. Therefore, it is seen that the reflected capacity of the winding assembly of the present invention is reduced by a factor of $(1/2n)$.

The diodes between windings and similar physical structure of adjacent windings produces symmetrical a-c voltage distributions along the height of the adjacent windings. The production of symmetrical voltage distributions on adjacent windings results in minimum capacitance effects between the windings sometimes referred to hereinafter as the interwinding capacitance. However, it is to be understood that a symmetrical voltage distribution on adjacent windings and the minimization of capacitance effects are not always necessary nor desirable. In certain cases, it may desirable to increase the capacitance effects, depending upon the leakage inductance value, to effect proper tuning. In such a case, asymmetrical voltage distributions along the height of the windings would be desirable.

A second means of providing a-c isolation for each of the windings is to provide symmetrical winding pairs mounted on the core with the windings of each pair being mounted on opposite legs of the core. The pairs of windings are d-c connected (a-c separated) by diode means. The symmetry of the windings of each pair of windings causes an a-c null at the connection between the windings of the pair. Therefore, each of the windings of each pair are a-c isolated from the other and the pairs of windings are a-c isolated by diode means. This method of a-c isolation results in fewer diodes being required for a specified number of windings and may result in an a-c null in the windings adjacent to the core if the start turns of the windings are connected together in the pairs.

As mentioned above, the stray capacitance and leakage inductance of the high voltage winding assembly are used for tuning of the high voltage winding assembly to predetermined resonant frequencies. Therefore, it is not necessarily desirable to seek the smallest possible stray capacitance and smallest possible leakage inductance, but to provide predetermined values of stray capacitance and leakage inductance to provide tuning at the proper predetermined resonant frequencies. It is also an object of this invention to provide means for enabling the selection of predetermined values of stray capacitance and leakage inductance. Although the smallest possible values of stray capacitance and leakage inductance are not always required, generally the emphasis will be on the reduction of stray capacitance and leakage inductance since it is desired to produce a rectangular shaped output pulse which requires tuning at a plurality of higher resonant frequencies.

The leakage inductance of the high voltage winding assembly may be varied by varying the spacing between adjacent windings of the high voltage winding assembly. Leakage inductance of a winding may be defined as the flux linkage which links one coil but not a second coil. The spacing between windings may be selected to adjust the leakage inductance of the high voltage winding assembly. Varying the spacing distance between the windings does not appreciably affect the stray capacitance of the secondary. The symmetrical a-c voltage distribution along the height of the adjacent windings minimizes the interwinding capacitance effects and therefore varying the spacing between adjacent windings has a minimal effect on the overall stray capacitance of the high voltage winding assembly.

The present invention reduces voltage gradients in the high voltage winding by the generation of a plurality of smaller a-c voltages which are individually rectified and summed to produce the required high voltage output. This results in smaller a-c voltages being present at any point in the high voltage winding assembly. The breakdown potential for a-c voltages is much lower than the breakdown potential for d-c voltages. Therefore, by converting the smaller a-c voltages into smaller d-c voltages which are summed, large a-c voltages are eliminated with the large voltage being a d-c voltage only.

Large potential gradients within the windings themselves are substantially reduced by reason of the narrow width coils. Because of the narrow width of the coils, there are substantially fewer turns per layer. Therefore, the induced voltage developed across a layer of turns is substantially less than in the case where there are a large number of turns per layer. This results in smaller voltage differences from layer to layer with the result of a decrease in magnitude of potential gradients.

One advantage of the present invention is that it provides a relatively rectangular shaped pulse output in response to a non-rectangularly shaped pulse input thereby improving the regulation of the high voltage output of the high voltage winding assembly.

Another advantage of the present invention is that it enables tuning to predetermined resonant frequencies.

Another advantage of the present invention is that it enables the control of the a-c voltage distribution along the height of adjacent windings.

Another advantage of the present invention is that it enables control of the stray capacitance of the high voltage winding assembly.

Still another advantage of the present invention is that it enables control of the leakage inductance of the high voltage winding assembly without substantially affecting the interwinding stray capacitance.

Still another advantage of the present invention is that it converts a plurality of smaller a-c voltages into basically d-c voltages which are added to produce the high voltage d-c output thereby improving the reliability of the diode rectifiers and windings and reducing the potential for corona breakdown.

Still another advantage of the present invention is that the washer-shaped windings of the relatively narrow width and large height result in relatively small voltages between the layers of turns of the windings resulting in a reduced potential for insulation breakdown and increased reliability.

A still further advantage of the present invention is that it reduces the cost of providing regulated high voltage to the anode of a cathode ray tube in a television receiver and in other similar applications.

Briefly, in accordance with the present invention, a tunable high voltage winding assembly for a transformer is provided. A high voltage winding assembly is tuned to one or more predetermined resonant frequencies and adjusted for relative amplitude values at each of said resonant frequencies to produce a substantially rectangular output pulse. Multiple windings are provided having a selected height. The windings are spaced from each other by a selected distance less than said height to adjust primarily the leakage inductance of said winding assembly. Means are provided for positioning the a-c null of each of the windings. Each of the windings have a width equal to or less than the spacing between the windings and the combination of the height, width and spacing are selected such that a substantially rectangular output pulse is produced thereby achieving improved regulation of the output voltage.

BRIEF DESCRIPTION OF THE DRAWINGS

For the purpose of illustrating the invention, there are shown in the drawings forms which are presently preferred; it being understood, however, that this invention is not limited to the precise arrangements and instrumentality shown.

DETAILED DESCRIPTION OF THE PREFERRED EMBODIMENTS

Figures 1, 2, 3, 7:
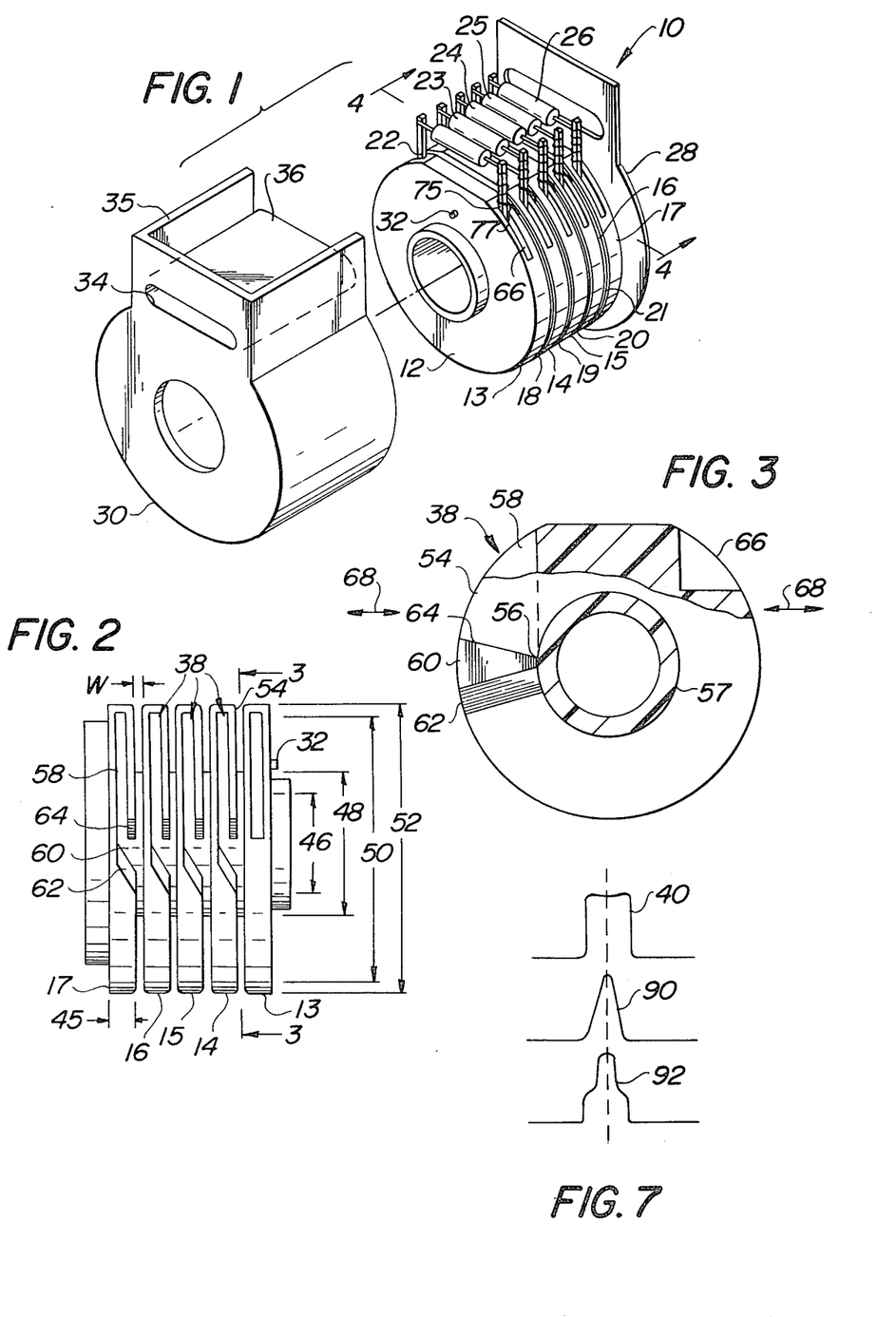
FIG. 1 is a view in perspective of a high voltage winding assembly and housing in accordance with the present invention.
FIG. 2 is a side elevation view of a coil form without the windings in accordance with the present invention.
FIG. 3 is a cross setional view, partially broken out, taken along line 3—3 of FIG. 2.
FIG. 7 illustrates the output wave form of the high voltage winding assembly of the present invention and some typical shapes produced by prior art devices.

Referring now to the drawings, wherein like numerals indicate like elements, there is shown in FIG. 1 a high voltage winding assembly which is sometimes referred to as the tertiary winding of the horizontal output transformer of a television receiver. In the succeeding description, it may be helpful to simultaneously refer to FIGS. 1, 2, 3, 4, 5, and 6 taken together. A coil form 12 is provided with members 13, 14, 15, 16 and 17 which may sometimes be referred to as partition members. The partition members 13, 14, 15, 16, and 17 form slots in which coils 18, 19, 20 and 21 are wound.

Figure 6:
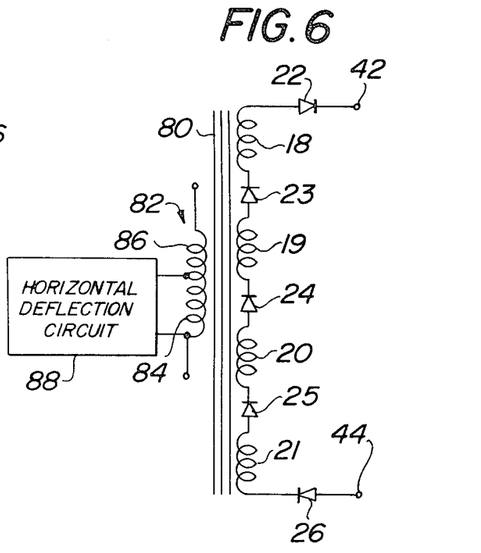
FIG. 6 is a schematic diagram, partially in block diamgram form, of a high voltage winding assembly and related circuitry in accordance with the present invention.

Referring now particularly to FIG. 1 in conjunction with the schematic diagram of FIG. 6, the coils 18 through 21 are connected in series through diodes 23 through 25 and a diode is connected in series at each end of the group of windings 18 through 21. In other words, a diode 22 is connected at one end of the coil or winding 18 and a second diode 26 is connected to the free end of coil or winding 21. Although the drawings illustrate a single diode at each location, it is understood and it is well known in the art that a plurality of diodes connected in series and in the same polarity may be the equivalent of a single diode. Multiple diodes are sometimes used in place of a single diode to increase voltage ratings. The diodes provide rectification of the a-c voltage which is induced into each of the windings 18 through 21. This results in the output of each of the windings 18 through 21 being a d-c voltage which is then summed to produce the relatively large output voltage of the high voltage winding assembly 10. By converting the induced voltage in each winding into a d-c voltage, very large a-c voltages and therefore very large a-c voltage potential gradients are eliminated thereby reducing the likelihood of unwanted corona discharges. The only large voltages present in the high voltage winding assembly are d-c voltages which have higher corona breakdown potentials than do a-c voltage. In other words, corona discharge occurs at smaller voltages when an a-c signal is present as contrasted to a d-c voltage level.

Diodes 23 through 25, in addition to the rectification function, provide a-c isolation between the windings 18 through 21. Diode 26 floats winding 21 with respect to ground. Diodes 22 through 26 force the a-c null of each of the windings 18 through 21 into the winding. The exact position of the a-c null in the winding is primarily a function of the diodes, the stray capacitance to ground and the stray capacitance to free space. With the stray capacitance to ground equal to the stray capacitance to free space, the a-c null of the windings will be located at approximately the center of the winding. The ground plane in the case of the high voltage winding assembly presently under consideration is the core. As more of the turns of each winding are spaced farther from the core, the capacitance to ground of the winding is decreased. As the width of the winding is decreased, the capacitance to ground decreases. The stray capacitance of the winding varies slightly, as compared to the stray capacitance to ground, as the height and width of the winding are adjusted. Therefore, by adjusting the height and width of a particular winding, the capacitance to ground may be adjusted to approximately equal the stray capacitance to the free space thereby positioning the a-c null in the center of the winding, assuming that the diodes are connected as described above.

By means of diodes 22 through 26 and the symmetrical height and width dimensions of adjacent windings 18 through 21, a symmetrical a-c voltage distribution is generated along the height of each of the windings 18 through 21 with the a-c null being located, in one of the preferred embodiments, at approximately the center of each of the windings. The symmetrical a-c voltage distribution on adjacent windings reduces the stray capacitance in the form of interwinding capacitance, or at least reduces the interwinding capacitance effects. In other words, by the generation of symmetrical a-c voltage distributions along the height of adjacent windings, the effects of the interwinding capacitance are minimized even though the physical structure may have an inherent fixed capacity due to the structure. The reduction of the effects of the interwinding capacitance allows tuning of the high voltage winding assembly 10 to higher frequencies than otherwise would be possible.

However, the primary object of the present invention is to provide a means of tuning a high voltage winding of a flyback transformer in order to provide a substantially rectangular pulse output to improve the regulation of the output voltage. Therefore, achieving the smallest possible value of interwinding capacitance, other stray capacitances and inductances of the high voltage winding assembly is not always necessary nor desirable. The object of the present invention is to provide a means to adjust interwinding capacitance, other stray capacitances and the leakage inductance of the high voltage winding assembly 10 in order to enable tuning of the high voltage winding assembly to resonant frequencies in the range of 4.5 to 7.5 times the frequency of the applied pulse. The frequency of the applied pulse has been defined previously to mean the reciprocal of twice the pulse width of the applied flyback pulse. Although the purpose of the present invention is not to necessarily achieve the absolute minimum stray capacitance and leakage inductance of the high voltage winding assembly, generally smaller values than were available in conventional prior art devices are sought to enable tuning of the high voltage winding assembly to higher frequencies.

The leakage inductance of the high voltage winding assembly may be varied or the proper value of leakage inductance selected by varying the spacing between windings 18 through 21. Leakage inductance of a winding is proportional to the amount of magnetic flux which is present in a winding which does not couple to the primary winding. Increasing the spacing between windings 18 through 21 causes a decrease in the leakage inductance of high voltage winding assembly 10 by reducing unnecessary flux linkage with other high voltage windings. Even more importantly, due to the fact that there is a symmetrical voltage distribution generated along the height of adjacent windings, the varying or selecting of the spacing between the windings adjusts the leakage inductance of the high voltage winding assembly without appreciably affecting the stray capacitance and in particular the interwinding capacitance effects. This provides an extremely valuable means for tuning the high voltage winding assembly since usually adjustments which decrease leakage inductance result in an increase in stray capacitance thereby maintaining the tuned resonant frequencies relatively constant due to the fact that the changes in capacitance substantially cancel out the changes in inductance. The changes in capacitance would not completely cancel out the changes in inductance since the two usually vary at different rates.

The plurality of windings isolated from each other by diodes result in lower a-c voltages since the voltage induced into each winding is rectified and the d-c voltages are summed to produce the required d-c voltage output. The $n$ windings making up the high voltage winding assembly divides the a-c voltage by $n$ by reason of the diode separation. Furthermore, the location of the a-c null at the center of each winding causes the maximum or peak a-c voltages to ground to be one-half of the $1/n$ voltage. This is due to the fact that the a-c null is at the center of each of the plurality of windings, the winding acts for a-c purposes as though the center of the winding were grounded with one-half of the a-c voltage being generated between the center and one end of the winding and the other half of the voltage being generated between the center and the other half of the winding with the two end of the winding being of opposite phase. Therefore, the peak a-c voltage to ground its one-eighth the peak a-c voltage to ground of a conventional high voltage winding where $n$ is selected to be four windings as in one of the preferred embodiments disclosed herein. However, it is understood that four windings are illustrated by way of example, and not by way of limitation. It is understood that in specific applications, a greater or lesser number of windings may be used within the scope of the present invention.

The present invention, in addition to reducing the likelihood of corona discharge by reducing the a-c voltages to ground, also reduces voltage breakdown problems within the windings themselves. The narrow width windings have fewer turns per layer of winding. In an ideal transformer, the same electromotive force (emf) is induced in each turn of the winding. In practice, this is substantially accurate. Therefore, as the number of turns per layer of winding is reduced, the voltage induced across that layer is also reduced. With the layers of turns stacked on top of each other in the winding, a smaller voltage exists between turns in adjacent layers. For example, if a winding has 10 turns per layer instead of 50 turns per layer and 1 volt is induced in each turn, the voltage between turns of adjacent layers will be 10 volts instead of 50 volts. However, an example of 10 turns is by way of illustration and not by way of limitation.

Figure 4:
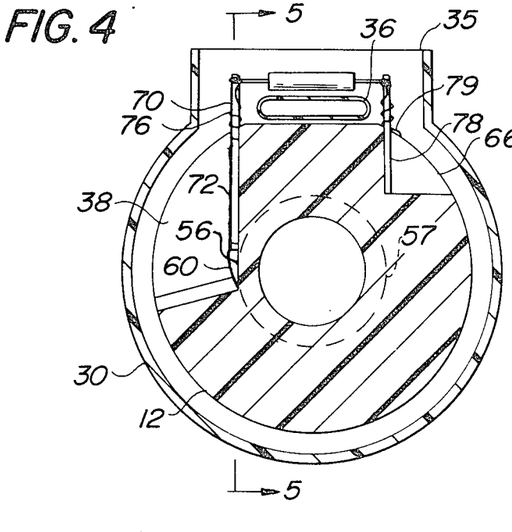
FIG. 4 is a cross sectional view taken along line 4—4 of an assembled FIG. 1.
Figure 5:
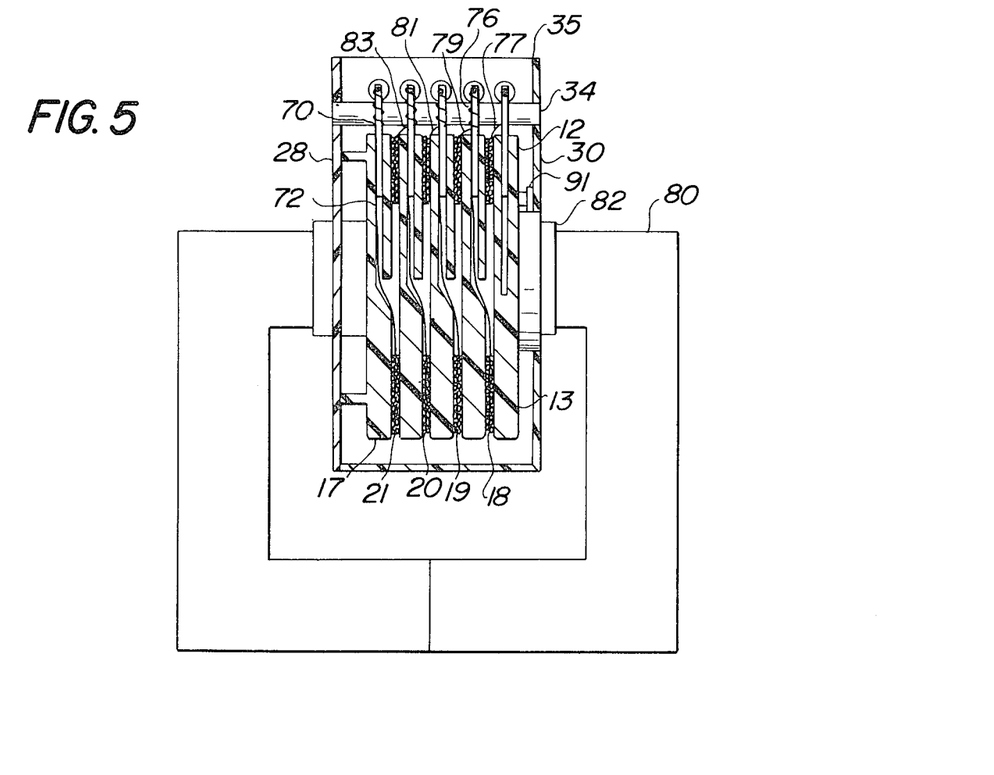
FIG. 5 is a cross sectional view taken along line 5—5 of FIG. 4 with added illustration of a core means and primary and secondary windings.

Referring now to the drawings in more detail, a presently preferred embodiment of the invention is shown in FIGS. 1 through 6. High voltage winding 10 is provided with a housing comprised of mating members 28 and 30. Coil form 12 may be provided with a projecting pin 32 which mates with a groove, slot or female connector 91 on the inside of member 30 is shown in FIG. 5 for aiding in rapidly and accurately positioning member 30 over coil form 12. Housing member 30 may be provided with an opening 34. A shaped tubular member 36 may be provided between the top of the coil form 12 and diodes 22 through 26 to provide thermal isolation between coils 18 through 21 and the diodes. Once housing member 30 is assembled over coil form means 12 and against housing member 28, the coil form, windings and diodes may be encapsulated by filling the housing through opening 35 with epoxy, silicone or some other suitable insulating compound used for encapsulation. The positioning of the slots or windings 18 through 21 parallel to the pouring direction of the encapsulating compound through opening 35 is important in order to avoid air pockets and voids which may adversely affect the electrical properties and reliability of the high voltage winding assembly 10.

It is apparent that alternate means of mounting the windings may be provided. For example, the windings may be wound by other means and then encapsulated in a potting compound thereby eliminating the need for coil form 12.

Referring now to FIG. 2, there is shown a side elevation view of a coil form 12 of FIG. 1 without the windings 18–21 and diodes 22–26. As may be seen, FIG. 2 is a view of the back side of FIG. 1 illustrating grooves 38 in member 13 through 17 for making electrical connections to the inside ends of windings 18 through 21. Grooves 38 will be discussed more fully hereinafter in conjunction with FIGS. 3, 4, and 5.

Coil form 12 is comprised of a dielectric material which may preferably be a mixture of polyphenelyne oxide and polystyrene which is commercially available from the General Electric Company, Selkirk, New York, 12158 under the trademark "NORYL". Preferably, the mixture of polyphenelyne oxide and polystyrene is filled with 10% glass by weight in the form of glass fibers or beads. The glass filling increases the stability of the dissipation factor with frequency and temperature variations, and increases the mechanical strength of coil form 12. However, it is understood that coil form 12 may be eliminated as described above or that other suitable dielectric materials may be used for coil form 12, such as various acrylic resins sold under the trademarks "LUCITE" and "PLEXIGLAS" or any other suitable dielectric material having the properties of being adaptable to bubble free molding, high dielectric strength, ease of molding and economy.

The relative dimensions of coil form 12 and the relative dimensions of windings 18 through 21 are important for the electrical characteristics produced in accordance with the principles of the present invention. In order to produce a rectangular pulse output 40, as shown in FIG. 7, from output terminals 42 and 44 as shown in FIG. 6, when this invention is used as the high voltage winding of a television flyback transformer with an input pulse having a pulse width of approximately 13.5 microseconds, a preferred embodiment of the invention may have dimensions, referring to FIG. 2, of W equal to approximately 0.08 inch; the spacing between windings or the width of each of the members 13 through 17, dimension 45, being equal to approximately 0.22 inch; the inner diameter 46 of coil form 12 being equal to approximately 0.96 inch; the inner diameter 48 of windings 18 through 21 being equal to approximately 1.32 inches; the outer diameter 50 of windings 18 through 21 being equal to approximately 2.25 inches, subject to variation depending upon winding wire arrangement, exact diameter of the wire and thickness of enamel or other insulation on the wire; and the outer diameter 52 of coil form 12 being equal to approximately 2.75 inches. Preferably, 850 to 950 turns of 34 gauge (American Wire Gauge) wire having a wire diameter of 6.3 mils (diameter of wire plus insulation being approximately 7.5 mils) are provided for each winding 18 through 21. The wire may preferably provide approximately 10 turns per layer of winding, although the windings need not be wound in perfect layers. Each winding may be random wound. Although these dimensions are the currently preferred embodiment and best mode of practicing the invention, it is understood that these dimensions may vary and are not intended to be limiting. For example, it is possible to use 36 gauge wire or any other suitable wire size.

Referring now to FIG. 3, there is shown a cross sectional view taken along line 3—3 of FIG. 2 with a portion of wall 54 broken away. FIGS. 2 and 3 taken together with FIGS. 4 and 5 disclose means of making electrical connection to the inside end of windings 18 through 21 with a minimum probability or likelihood of corona discharge. This aspect is claimed in a co-pending application of Wayne M. Niederjohn and John R. Underwood entitled "High Voltage Lead and Terminal Structure," U.S. Patent Application Ser. No. 644,980, filed the same day as this application and assigned to the assignee herein. Groove 38 is tangent to the inside diameter of the windings at point 56 as shown in FIGS. 3 and 4. Groove 38 is comprised of a first portion 58 parallel to the windings 18 through 21 and a second portion forming an opening 60 into the winding slot. The opening 60 of the groove 38 is provided with tapered surfaces 62 and 64. A groove 66 is provided opposite groove 38 for receiving a terminal pin. The grooves 58, 60 and 66 are open in the directions of double-headed arrows 68 thereby allowing production molding by allowing free movement in the direction of double-headed arrows 68.

Referring now to FIGS. 4 and 5, the terminal structure and winding arrangement are shown in more detail. As may be seen from the drawings, the windings 18 through 21 are of relatively narrow width and substantial height wound between relatively wide members 13 and 17. The voltage or potential difference developed across the height, in other words, the a-c voltage difference between the innermost and outer most turns of a winding, may in a typical case be on the order of 8,000 to 10,000 volts. It is known that a sharp point or very small radius conductor has an extremely high electric field intensity at its surface when subjected to an electric field. The wire of the windings is relatively fine wire having a small radius. A start lead of fine wire running down along the height of the winding would be subject to an extremely high electric field intensity due to its small radius thereby subjecting it to probable corona emission and corona discharge or arcing.

In order to avoid these problems, a conductor 70, having large cross sectional dimensions with respect to the cross sectionl dimensions of wire 72 of the winding, is provided in groove 38. In order to enable the winding of the windings 18 through 21 by automatic winding machinery, conductor 70 is mounted tangent to the innermost turns of the winding or in other words, tangent to the inner winding circumference 57 of coil form 12 at point 56. As may be best understood by reference to FIGS. 4 and 5, conductor 70 is inserted into groove 38. Wire 72 may be wrapped around conductor 70 at 76. Wire 72 is then pulled tight against conductor 70 and through opening 60 by automatic winding machinery which may be used to wind the winding. However, it is understood that this operation may be performed manually or by any other suitable means. When the winding is completely wound, its outside end 77 is connected to a terminal pin 75 shown in FIG. 1. Terminal pin 75 is similar to terminal pin 78 in groove 66 shown in FIG. 4. End wires 77, 79, 81 and 83 of the outermost turns are shown in FIG. 5 connected to terminal pins located behind conductors 70 in FIG. 5.

Referring again to FIG. 5, there is shown coil form 12 and windings 18 through 21 mounted on a core means 80. A combined primary and secondary winding 82 is mounted between core means 80 and the inner diameter of coil form means 12.

Referring to FIG. 6, there is shown a schematic diagram indicating the combined primary and secondary winding 82. The combined primary and secondary winding 82 conserves copper in a conventional manner by using portion 84 of the combined winding as the primary fed by the output of the horizontal deflection circuit 88. Portion 86 of the combined winding 82 in conjunction with the primary winding 84 serves as an autotransformer to provide a horizontal output wave form to the deflection yoke of the cathode-ray tube in the conventional manner. However, it is to be understood that various other suitable arrangements of primary and secondary windings may be used in practicing the principles of the present invention.

Figure 8:
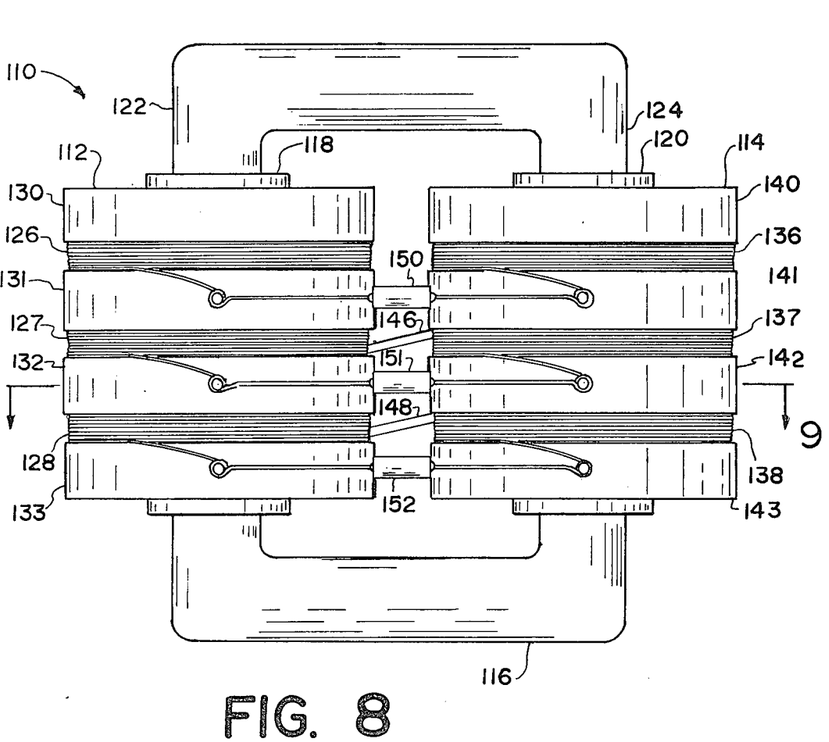
FIG. 8 is a side elevation view of an alternate embodiment of the present invention.
Figure 9:
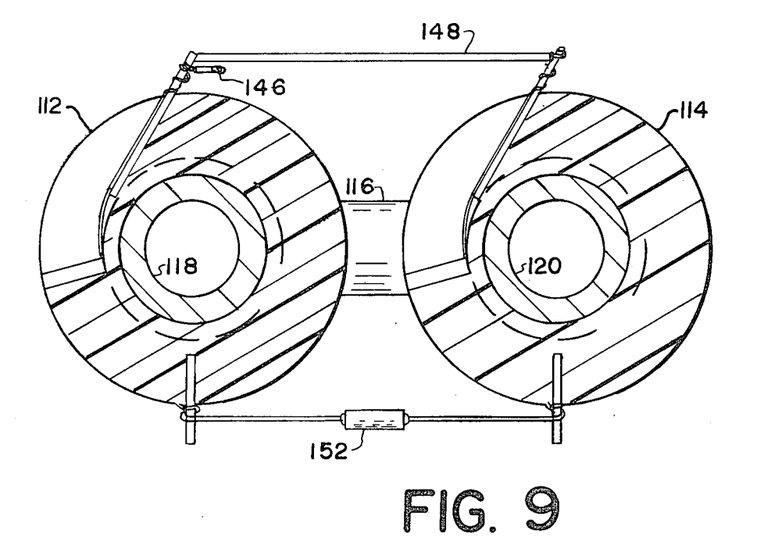
FIG. 9 is a cross sectional view taken along line 9—9 of FIG. 8.

Referring now to FIG. 8, there is shown another embodiment of a high voltage winding assembly utilizing the principles of the present invention. The high voltage winding assembly shown in FIGS. 8 and 9 contains inventive concepts in addition to those of the present invention which are disclosed more fully and claimed in U.S. Patent Application Ser. No. 645,012, entitled "High Voltage Transformer Winding Assembly," filed by Charles Suthers of even date with this application and assigned to the assignee herein. There is shown in FIGS. 8 and 9 a high voltage winding assembly 110 comprised of a first coil form means 112 and a second coil form means 114 mounted on opposite legs of a core means 116. The primary winding, which may be a combined primary and secondary winding, is split into two parts 118 and 120. Portion 118 of the primary winding is mounted over core leg 122 and inside of coil form means 112. The portion 120 of the primary winding is mounted over core leg 124 and inside of the inner diameter of coil form means 114. Portions 118 and 120 of the primary winding are connected to provide additive flux in core means 116.

Coil form means 112 is provided with windings 126, 127 and 128 wound between members 130 through 133 of coil form 112. Windings 136, 137 and 138 are provided on coil form means 114 wound between members 140 through 143.

The innermost turns or start leads of windings on opposite legs are connected together by means of wires 146 and 148. The outermost or finish leads of windings on opposite legs 122 and 124 are connected in series-aiding relationship by means of diodes 150, 151, and 152. For example, but not by way of limitation, the start leads of windings 128 and 137 may be connected together. Diode 152 may be connected in series with the finish leads of windings 138 and 128. Diode 151 is connected in series with the finish leads of windings 137 and 127 and diode 150 is connected in series between the finish leads of windings 136 and 126, with all diodes being poled in a series-aiding relationship. The start leads of windings 126 and 138 form the external connections to the high voltage winding assembly.

In the embodiment shown in FIGS. 8 and 9, symmetrical voltage distributions are generated along the height of adjacent windings with a fewer number of diodes. In the specific example, illustrated in FIG. 8 by way of illustration and not by limitation, three diodes are used for six windings. In a preferred embodiment, the winding pairs comprised of windings 128 and 137, 127 and 136, and 138 and 128 are provided with the windings in each pair being equal in height, width, number of turns, etc. thereby creating equal voltages of opposite polarity at the finish leads of the two windings of each pair as measured with respect to the common connecting wire, i.e. the start leads. This places the a-c null of each winding pair at the connection point between the windings of the pair. For example, the a-c null of winding pair 128 and 137 is located on connecting wire 148 and innermost or start leads of windings 128 and 137. Therefore, in addition to creating a symmetrical a-c voltage distribution along the height of adjacent windings, the a-c null of each of the windings is located on the innermost turns of the windings for winding pairs on opposite legs having approximately equal parameters. This places the a-c null in the portion of the winding closest to the core. The a-c null located adjacent the core minimizes the possibility of corona discharge between the windings and the core.

In accordance with the principles of the present invention, the high voltage winding assembly 110 may be tuned by varying the height and width of the winding to adjust the stray capacitances, primarily the stray capacitance to ground. The spacing between windings may be selected to provide the desired value of leakage inductance, without appreciably affecting interwinding capacitance, to effectuate tuning of the high voltage winding assembly to produce proper shaping of the pulse output. The high voltage winding assembly shown in FIGS. 8 and 9 also provides for adjusting the leakage inductance by varying the spacing between windings on opposite legs of the core. This is treated more fully in the Suthers application referred to above. Proper shaping of the pulse output, preferably that of a rectangular-shaped pulse output, by tuning provides improved regulation of the output voltage.

In operation, referring particularly to FIGS. 1 through 7, the high voltage winding assembly 10 of the present invention produces a relatively rectangular pulse output 40 as shown in FIG. 7 in response to the flyback pulses present in the horizontal output circuitry of a conventional television receiver which are not rectangularly shaped. This output pulse wave form 40 is in contrast to conventional prior art pulse wave shapes 90 and 92 shown in FIG. 7. The present invention enables the production of the relatively rectangular pulse output 40 by enabling the tuning of the high voltage winding assembly to resonant frequencies in the ranges of 4.5 to 7.5 times the fundamental. The high voltage winding assembly 10 does not produce the exact wave shape present in the primary, but converts the wave shape to a more suitable substantially rectangular pulse output which improves the voltage regulation of the high voltage output with variations in load current.

Tuning of the high voltage winding assembly to resonant frequencies in the range of 4.5 to 7.5 times the frequency of the input pulse is accomplished, in accordance with the principles of the present invention, by adjusting the values of leakage inductance and stray capacitance of the high voltage winding assembly to resonate at the predetermined resonant frequencies. In accordance with the present invention, a plurality of physically separated and relatively narrow and relatively high windings are provided. The windings may be physically separated by partition members 13 through 17 which are of substantial width with respect to the width of the windings. The windings 18 through 21 are connected in a d-c sereis-aiding relationship. With respect to a-c, each of the windings 18 through 21 is effectively isolated for capacitive purposes from the other windings and the a-c null of the winding is forced to a point within the winding. The capacitance to ground of each of the windings 18 through 21 is adjusted by selecting a suitable height and width for the winding. By selecting similar height and width values of adjacent windings, adjacent windings are provided with symmetrical a-c voltage distributions along their heights. With symmetrical a-c voltage distributions on adjacent windings, the capacitance between windings or interwinding capacitance is at a minimum. However, by creating non-symmetrical voltage distributions on adjacent windings, the interwinding capacitance effects may be increased to produce the desired value of interwinding capacitance in a particular case where the more than the minimum capacitance is required for tuning.

In the embodiment of FIGS. 1 through 7, the height and width of the windings 18 through 21 may be selected to provide a capacitance to ground of each winding approximately equal to the capacitance to free space. This produces an a-c null approximately in the center of each winding. In the case of four windings separated by four diodes as shown in FIGS. 1 through 7, the magnitude of the a-c voltage and a-c voltage peaks are reduced to one-fourth their magnitude by reason of the diodes. By positioning the a-c null of each of the windings in the center of each winding the peak voltage with respect to ground is again cut in half for each winding due to the fact that opposite ends of each winding are of opposite polarity with the a-c null being in the center. For example, at a particular instant of time, one end of the winding may be at a positive peak voltage with respect to ground and the opposite end of the winding may be at a negative peak voltage with respect to ground. However, with the a-c null being in the center of the winding, these peak positive and negative a-c voltages with respect to ground are one-half of the peak voltage which would be generated if, for example, one end of the winding were grounded.

The leakage inductance of the high voltage winding assembly 10 may be adjusted or varied by adjusting or selecting the width of the spacing between windings. A relatively wide spacing between the windings 18 through 21 reduces the mutual coupling between the individual windings 18, 19, 20 and 21 thereby reducing the leakage inductance of the high voltage winding assembly. In accordance with an important aspect of this invention, the leakage inductance of the high voltage winding assembly 10 may be varied without substantially affecting the interwinding capacitance effects. Normally, the varying of the spacing between two adjacent relatively high windings would substantially affect the capacitance between the windings. However, as described above, in accordance with the principles of the present invention, symmetrical a-c voltage distributions are generated along the height of adjacent windings. Therefore, the varying of the spacing between the windings to adjust the leakage inductance does not cause substantial variations in the capacitance effects.

In addition to the reduction of peak a-c voltages by use of the diodes and by positioning of the a-c null within the winding, the probability of insulation breakdown of the wire within each of the windings is reduced by means of the present invention. As is well known, an approximately equal voltage or emf is induced in each turn of a winding of a transformer. In a winding, there are usually a predetermined number of turns in the first layer and a predetermined number of turns in each succeeding layer with a predetermined number of layers being wound on top of each other. In the present invention, the windings are relatively narrow with relatively few turns per layer. Therefore, the voltage difference across each layer and the voltage difference between turns of one layer and the turns of an adjacent layer are much less than in the case where a large number of turns per layer are used. Although this would be very important even in a perfectly wound winding in which layers are perfectly formed, it is even more important in applications where it is desirable to use a random winding process over other methods of winding. In the random winding process, it is possible to have turns "fall through" as much as two or three layers. Therefore, by having a smaller voltage difference across each layer, an economical random winding process may be used with the voltage gradients being maintained within the limits of the dielectric strength of the insulation of the wire.

It will be apparent to those skilled in the art that various changes and modifications may be made to the embodiments of the invention disclosed herein within the scope and teachings of the present invention. For example, it is clear that various numbers of windings may be used and that these windings may be separated into subassemblies on different legs of a core. It is also clear that the number of diodes may be varied in accordance with the tuning and a-c null placement desired. Furthermore, it is clear that the dimensions given in the application are by way of example of one of the presently known best modes of practicing the invention and are not in any way intended to be limiting. It is clear that many variations of the invention will be obvious to those skilled in the art.

In view of the above, the present invention may be embodied in other specific forms without departing from the spirit or essential attributes thereof and, accordingly, reference should be made to the appended claims, rather than to the foregoing specification as indicating the scope of the invention.

We claim:

1. A transformer for providing rectangular shaped high voltage pulses to the cathode ray tube of a television receiver in response to input voltage pulses being applied to said transformer, said transformer comprising:
   a magnetic core,
   a primary winding mounted on said core and responsive to said input voltage pulses,
   coil form means mounted on said core and including a plurality of partition members forming a plurality of slots,
   a plurality of relatively tall and narrow washer-shaped high voltage windings, each being wound in one of said slots,
   means interconnecting said high voltage windings in series-aiding relationship,
   the height and width of each high voltage winding being selected to control predominantly the capacitance of said winding,
   the width of each partition member of said coil form means being selected to adjust the spacing between adjacent high voltage windings to thereby control substantially only the leakage inductance between adjacent windings,
   said height, width and spacing being chosen such that the tuning of said high voltage windings occasioned by the combined effect of said capacitance and leakage inductance shapes said high voltage pulses to be substantially rectangular.

2. The transformer recited in claim 1, wherein said means interconnecting said high voltage windings are diode means.

3. The transformer recited in claim 2 wherein the height and width of each high voltage winding and the spacing between windings are substantially uniform.

4. The transformer recited in claim 2 wherein the spacing between high voltage windings is at least as great as the width of each high voltage winding.

5. The transformer recited in claim 4 wherein the height of each high voltage winding is at least eight times the width thereof.

6. The transformer recited in claim 5 wherein the spacing between high voltage windings is at least two times the width of each high voltage winding.

7. A transformer for providing regulated high voltage to the cathode ray tube of a television receiver in response to an input voltage being applied to said transformer, said transformer comprising:
   a magnetic core,
   a primary winding mounted on said core and responsive to said input voltage,
   coil form means mounted on said core and including a plurality of partition members forming a plurality of slots,
   a plurality of relatively tall and narrow washer-shaped high voltage windings, each being wound in one of said slots,
   means interconnecting high voltage windings in series-aiding relationship,
   the height and width of each high voltage winding being selected to produce an a-c voltage distribution along the height of each winding that is substantially equal to the a-c voltage distribution for the other of said high voltage windings.

8. The transformer recited in claim 7, wherein said means interconnecting said high voltage windings are diode means, and wherein the width of said partition members is selected in conjunction with the use of said diode means to provide substantial a-c isolation between said high voltage windings.

* * * * *